United States Patent
Ferris et al.

(10) Patent No.: US 8,738,905 B2
(45) Date of Patent: May 27, 2014

(54) THIRD PARTY SECURED STORAGE FOR WEB SERVICES AND WEB APPLICATIONS

(75) Inventors: Christopher B. Ferris, Northbridge, MA (US); Daniel E. House, Raleigh, NC (US); Kelvin Lawrence, Round Rock, TX (US); John R. McGarvey, Apex, NC (US); Dirk Nicol, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/953,318

(22) Filed: Dec. 10, 2007

(65) Prior Publication Data

US 2009/0150682 A1 Jun. 11, 2009

(51) Int. Cl.
*H04L 29/06* (2006.01)
(52) U.S. Cl.
USPC ........... 713/166; 713/164; 713/165; 713/182; 726/4; 726/5; 709/220
(58) Field of Classification Search
USPC ................. 713/152, 164, 165, 166, 182, 183; 726/4, 5, 17, 21; 709/220
See application file for complete search history.

(56) References Cited

U.S. PATENT DOCUMENTS

| 6,526,582 | B1 * | 2/2003 | Brodigan et al. | 725/87 |
| 7,100,205 | B2 * | 8/2006 | McDermott | 726/22 |
| 7,243,241 | B1 * | 7/2007 | Katsumata et al. | 713/193 |
| 7,415,721 | B2 * | 8/2008 | Fransdonk | 726/4 |
| 7,693,838 | B2 * | 4/2010 | Morgan et al. | 707/781 |
| 7,698,392 | B2 * | 4/2010 | Zapata et al. | 709/220 |
| 7,716,720 | B1 * | 5/2010 | Marek et al. | 726/2 |
| 8,051,491 | B1 * | 11/2011 | Cavage et al. | 726/30 |
| 8,166,310 | B2 * | 4/2012 | Harrison et al. | 713/184 |
| 8,327,450 | B2 * | 12/2012 | Clement et al. | 726/26 |
| 2002/0095572 | A1 * | 7/2002 | Frank et al. | 713/166 |
| 2003/0014643 | A1 * | 1/2003 | Asami et al. | 713/182 |
| 2004/0123271 | A1 * | 6/2004 | Bindewald et al. | 717/124 |
| 2004/0215749 | A1 * | 10/2004 | Tsao | 709/220 |
| 2006/0136720 | A1 * | 6/2006 | Armstrong et al. | 713/164 |
| 2007/0266444 | A1 * | 11/2007 | Segal | 726/27 |
| 2009/0064297 | A1 * | 3/2009 | Selgas et al. | 726/6 |
| 2009/0164779 | A1 * | 6/2009 | Yan et al. | 713/165 |

OTHER PUBLICATIONS

Yousef, Bushar; Hoang, Doan B.; Rogers, Glynn; "Partitioning and Differentiated Resource Allocation in Programmable Networks", Proceedings of the 10$^{th}$ IEEE Symposium on Computers and Communications, Jun. 27-30, 2005, pp. 840-845.*
Jian-Zhong, Huang; Chang-Sheng, Xie; Guang-Xi, Zhu; Gang, Zhou; Wei, Wu; "Design and Analysis of a Third-Party Security Protocol for Storage System", International Workshop on Networking, Architecture, and Storages, 2006, 6 pages.*
Microsoft, Safety & Security Center, Online Privacy & Safety, Create Strong Passwords, printed Feb. 28, 2011.
Wikipedia, Password Strength, printed Feb. 28, 2011.

* cited by examiner

*Primary Examiner* — Victor Lesniewski
(74) *Attorney, Agent, or Firm* — Terrile, Cannatti, Chambers & Holland, LLP; Stephen A. Terrile

(57) ABSTRACT

A system and method for providing third party secure hosting of an application. The system and method includes providing a host system with a main memory and a third party secured memory, the third party secured memory storing third party information; encrypting the third party information stored on the third party secured memory upon access by a user, the encrypting being via a security key, the security key being held at a customer location; and, enabling access to the third party information only to users having the security key.

9 Claims, 7 Drawing Sheets

THIRD PARTY SECURED STORAGE FOR WEB SERVICES AND WEB APPLICATIONS

BACKGROUND OF THE INVENTION

The present invention relates in general to data processing systems and in particular to third party secured storage for applications such as Web services and/or Web applications.

It is known for a third party to host and operate Web services and/or Web applications for a customer. For example, referring to FIG. 1, labeled Prior Art, a typical third party Web application environment comprises three main entities. More specifically, a third party Web application environment comprises requesters located somewhere in the Internet, a host computer where a Web application is executing, and storage such as disk storage. It is transparent to the requestor where the Web service is executing. For example, if a customer such as a large retail company has a Web service that they want to make available to requesters on the Internet. The retail company's Web service might be executed by a third party global services organization. Thus the third party global services organization functions as the hosting company that owns and operates the physical computer on which the Web services are executed.

With this system, network security (e.g., HTTPS) secures data flowing between the Internet requestor and the host computer running the Web service. Additionally, known disk technology (e.g., encrypted disk) secures data flowing between the host computer and external physical storage (whether disk, tape, or other).

An issue that may inhibit the ability of a third party to provide these hosting services relates to the security of the Web services and Web applications. There are several points between a Web service requestor somewhere in the Internet and a Web service implementation where security is desired. It is known to provide network security between a requestor and a Web service host operating system. Additionally, it is known to provide security such as encrypted disk storage between the host operating system and disk storage.

However, it is possible that a security hole exists within the main memory of the computer systems on which the Web services or Web applications reside and operate. This hole can be especially troublesome to a customer when the Web services or Web applications manipulate sensitive data. Computer main memory can be viewed a variety of ways, such as via an operating system storage dump after a crash. Thus, potentially sensitive data from main memory can be viewable by hosting company personnel.

Some third party service providers have addressed this issue by enhancing physical security of the computing facility (i.e., limiting access to the actual computer on which the applications execute except hosting service employees) and or by providing access only to screened personnel at hosting companies. Another way in which this security issue has been addressed is by providing storage rings (or levels) of sensitivity where different levels of security are provided with different types of storage snapshots (this method may be used for example with certain types of government security classifications).

BRIEF SUMMARY OF THE INVENTION

In accordance with an aspect of the present invention, the invention relates to a method which includes providing a host system with both a main memory and a third party secured memory wherein the third party secured memory holds third party information, encrypting the third party information stored on the third party secured memory upon access by any entity where the encryption is a security key that is held at a customer location, and enabling access to the third party information only to users having the security key.

In another embodiment, the invention relates to a system which includes a processor, a data bus coupled to the processor, and a module for providing a host system with a main memory and a third party secured memory. The third party secured memory storing third party information. The module encrypts the third party information stored on the third party secured memory upon access by a user. The encryption is via a security key that is held at a customer location. The module enables access to the third party information only to users having the security key.

DETAILED DESCRIPTION OF THE INVENTION

Figure 1:
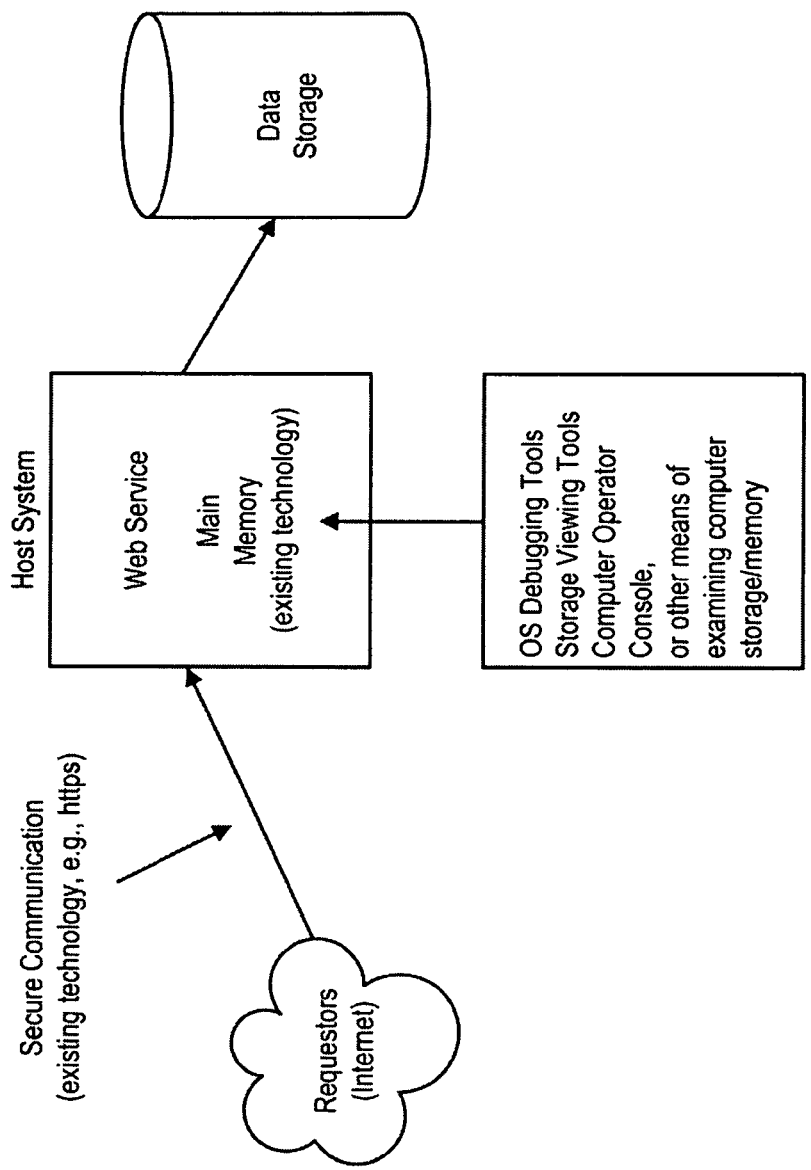
FIG. 1, labeled Prior Art, depicts a third party hosting environment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions, microcode, hardware or some combination of computer program instructions, microcode and hardware. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
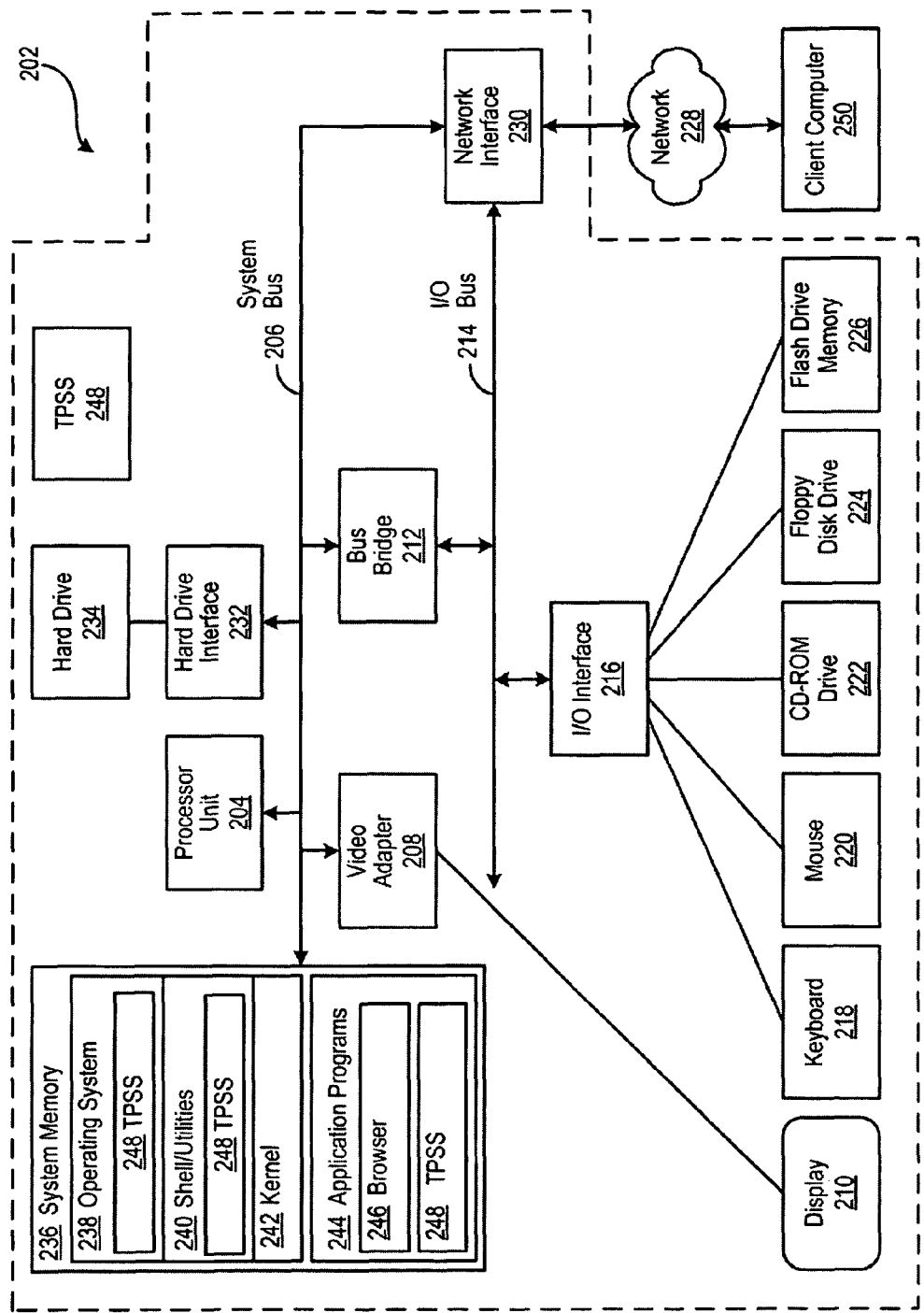
FIG. 2 depicts an exemplary hosting server computer in which the present invention may be implemented.

With reference now to FIG. 2, there is depicted a block diagram of an exemplary hosting computer 202, in which the present invention may be utilized. Computer 202 includes a processor unit 204 that is coupled to a system bus 206. A video adapter 208, which drives/supports a display 210, is also coupled to system bus 206. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 416 may be any known to those skilled in the art of computer architecture, including but not limited to Universal Serial Bus (USB) ports.

Computer 202 is able to communicate with a client 250 (which may also be a computer) via a network 228 using a network interface 230, which is coupled to system bus 206. Network 228 may be an external network such as the Internet, or an internal network such as an Ethernet or a Virtual Private Network (VPN). Using network 228, computer 202 is able to use the present invention to access service provider server 250.

A hard drive interface 232 is also coupled to system bus 206. Hard drive interface 232 interfaces with a hard drive 234. In one aspect of the present invention, hard drive 234 populates a system memory 236, which is also coupled to system bus 206. Data that populates system memory 236 includes the operating system (OS) 238 and application programs 244.

OS 238 includes shell/utilities 240, for providing transparent user access to resources such as application programs 244. Generally, shell/utilities 240 are a program that provides an interpreter and an interface between the user and the operating system. More specifically, shell/utilities 240 execute commands that are entered into a command line user interface or from a file. Thus, shell/utilities 240 (as it is called in a UNIX® operating system also called a command processor in a Microsoft® Windows® operating system, is generally the highest level of the operating system software hierarchy and serves as a command interpreter. The shell/utilities provide a system prompt, interpret commands entered by keyboard, mouse, or other user input media, and send the interpreted command(s) to the appropriate lower levels of the operating system (e.g., a kernel 242) for processing. Note that while shell/utilities 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., computer 202) to send and receive network messages to the Internet using HyperText Transfer Protocol (HTTP) messaging, thus enabling communication with service provider server 250.

The computer 202 also includes a third party secure storage system 248 which is stored in one or more of a plurality of locations within the computer 202. For example, the third party secure storage system 248 may be stored within the operating system 238 as the operating system 238 can implement certain functions of the third party secure storage system 248. Also for example, the third party secure storage system may be stored within the shell/utilities 240 as utilities to view the storage within the computer 202 are modified to provide third party secure storage. Also for example, the third party secure storage system 248 may be stored as an application program 244. Also for example, the third party secure storage may be implemented within hardware of the computer 202. The third party secure storage system 248 includes code for implementing the processes described below.

Figure 3:
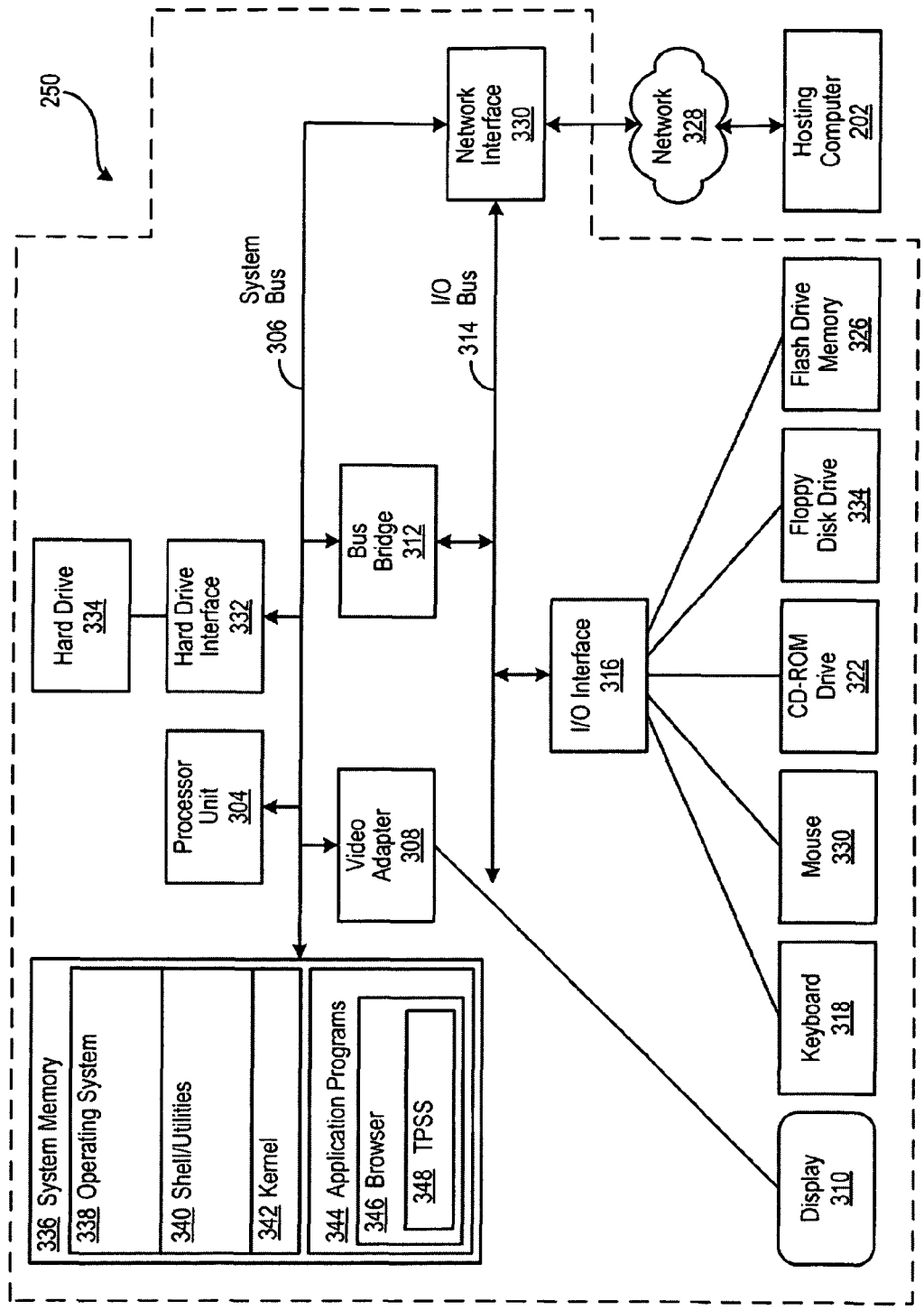
FIG. 3 depicts an exemplary client computer in which the present invention may be implemented.

With reference now to FIG. 3, there is depicted a block diagram of an exemplary client computer 250, in which the present invention may be utilized. The client computer is the computer on which a client configures a Web app to execute in TPSS on the hosting server; accordingly, the only TPSS on the client computer is stored within the browser.

More specifically, computer 250 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 416 may be any known to those skilled in the art of computer architecture, including but not limited to Universal Serial Bus (USB) ports.

Computer 250 is able to communicate with the hosting computer 202 via a network 328 using a network interface 330, which is coupled to system bus 306. Network 328 may be an external network such as the Internet, or an internal network such as an Ethernet or a Virtual Private Network (VPN). Using network 328, computer 250 is able to use the present invention to access service provider server 202.

A hard drive interface 332 is also coupled to system bus 306. Hard drive interface 332 interfaces with a hard drive 334. In one aspect of the present invention, hard drive 334 populates a system memory 336, which is also coupled to system bus 306. Data that populates system memory 336 includes the client computer's operating system (OS) 338 and application programs 344.

OS 338 includes shell/utilities 340, for providing transparent user access to resources such as application programs 344. Generally, shell/utilities 340 are a program that provides an interpreter and an interface between the user and the operating system. More specifically, shell/utilities 340 execute commands that are entered into a command line user interface or from a file. Thus, shell/utilities 340 (as it is called in a UNIX® operating system also called a command processor in a Microsoft® Windows® operating system, is generally the highest level of the operating system software hierarchy and serves as a command interpreter. The shell/utilities provide a system prompt, interpret commands entered by keyboard, mouse, or other user input media, and send the interpreted command(s) to the appropriate lower levels of the operating system (e.g., a kernel 342) for processing. Note that while shell/utilities 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., computer 250) to send and receive network messages to the Internet using HyperText Transfer Protocol (HTTP) messaging, thus enabling communication with service provider server 202. The browser also includes a third party secure storage system 348. The third party secure storage system 248 includes code for implementing the processes described below. In one embodiment, computer 250 is able to download third party secure system 348 from the hosting computer 202.

Figure 4:
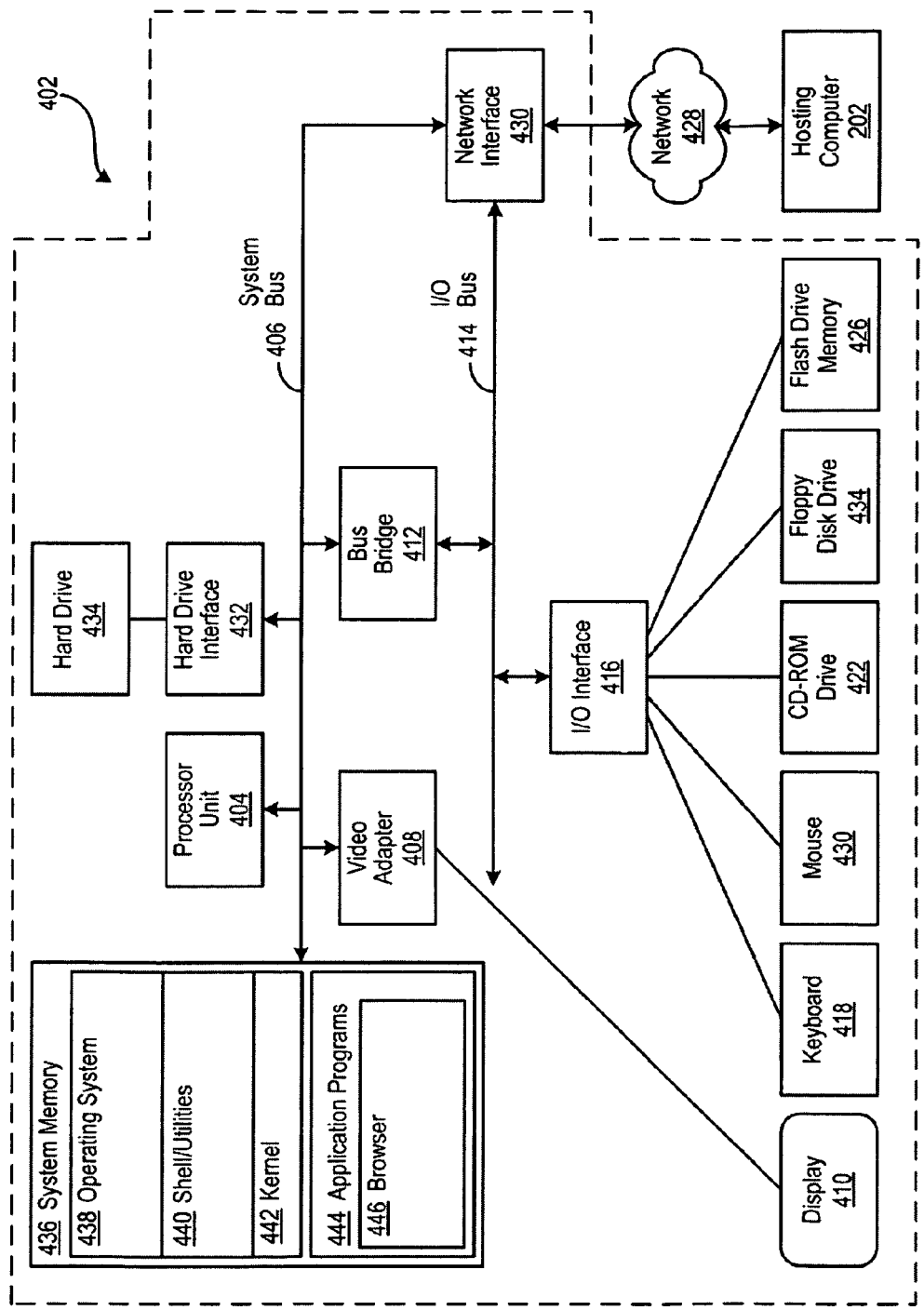
FIG. 4 depicts an exemplary client computer.

With reference now to FIG. 4, there is depicted a block diagram of an exemplary client computer 402, in which the present invention may be utilized. The client computer is the computer on which a client interacts with a host having third party secure storage. Accordingly, to the client computer 402 interaction with the host is transparent with respect to the third party secure storage More specifically, computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Computer 402 is able to communicate with the hosting computer 202 via a network 428 using a network interface 430, which is coupled to system bus 406. Network 428 may be an external network such as the Internet, or an internal network such as an Ethernet or a Virtual Private Network (VPN). Using network 428, computer 402 is able to use the present invention to access service provider server 202.

A hard drive interface 432 is also coupled to system bus 406. Hard drive interface 432 interfaces with a hard drive 434. In one aspect of the present invention, hard drive 434 populates a system memory 436, which is also coupled to system bus 406. Data that populates system memory 436 includes client computer's operating system (OS) 438 and application programs 444.

OS 438 includes shell/utilities 440, for providing transparent user access to resources such as application programs 444. Generally, shell/utilities 440 are a program that provides an interpreter and an interface between the user and the operating system. More specifically, shell/utilities 440 execute commands that are entered into a command line user interface or from a file. Thus, shell/utilities 440 (as it is called in a UNIX® operating system also called a command processor in a Microsoft® Windows® operating system, is generally the highest level of the operating system software hierarchy and serves as a command interpreter. The shell/utilities provide a system prompt, interpret commands entered by keyboard, mouse, or other user input media, and send the interpreted command(s) to the appropriate lower levels of the operating system (e.g., a kernel 442) for processing. Note that while shell/utilities 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., computer 402) to send and receive network messages to the Internet using HyperText Transfer Protocol (HTTP) messaging, thus enabling communication with service provider server 202.

The hardware elements depicted in computers 202, 250 and 402 are not intended to be exhaustive, but rather are representative to highlight essential components required by the present invention. For instance, the computers may include alternate memory storage devices such as magnetic cassettes, Digital Versatile Disks (DVDs), Bernoulli cartridges, and the like. These and other variations are intended to be within the spirit and scope of the present invention.

As noted above, the third party secure storage system 248 can be downloaded to a client computer from service provider server 202. Additionally, in one aspect of the present invention, service provider server 202 performs all of the functions associated with the present invention (including execution of the third party secure storage system 248), thus freeing a client computer 250 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Figure 5:
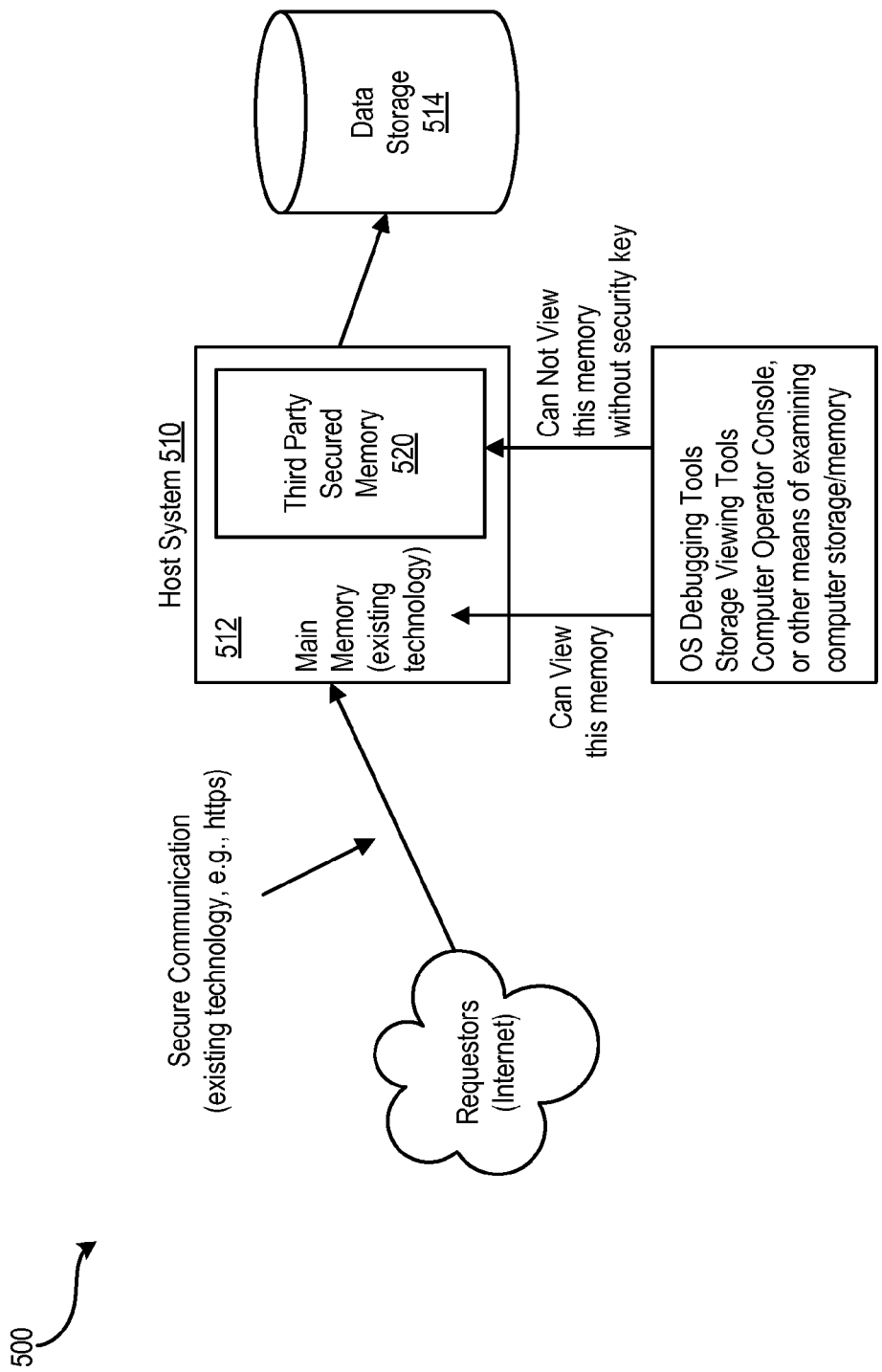
FIG. 5 depicts a third party secure storage environment and shows a hosting server with main memory and third party secured storage memory.

Referring to FIG. 5, a third party secure storage (TPSS) environment 500 is shown. More specifically, the TPSS environment includes a host operating system 510 which includes a main memory 512 as well as data storage 514, which may be secure data storage such as encrypted disk storage. Additionally, the host system 510 includes third party secured memory 520.

The third party secured memory 520 is not viewable by tools used by hosting company personnel. This third party secured memory 520 is only viewable (by people) using a security key (e.g., an encryption key and/or a strong password). Even when using the third party secure storage system 248, much of the information stored within the main memory 512, including various operating system and middleware structures, is viewable by typical tools used by hosting company personnel. This access to the main memory 512 is often necessary for debugging purposes. However, most of the time, hosting company personnel do not need access into the address space/memory that is being used in the user-space memory of the specific web service being hosted where potentially sensitive data resides. Accordingly, the third party secure storage system 248 enables access to the system for debugging purposes while protecting any sensitive customer data from access by any unauthorized individuals.

Thus the third party secure storage system 148 provides customers with additional assurances about the hosting company. The third party secure storage system 248 allows customers (i.e., owners of Web applications or Web services) to control who at hosting companies might be allowed to view sensitive data. When a customer contracts with a hosting company to host a Web service, for example, the third party secure storage system provides the customer with the ability to control whether hosting company personnel can view potentially sensitive data that resides in computer storage.

Operating systems and/or middleware and/or hardware that support this extra layer of customer assurance for sensitive data provide an advantage in the market. Thus, hosting companies are able to advertise to potential customers that their hosted web applications or Web Services are more secure.

Applications (such as a web service) do not need to change to use TPSS. Storage is not encrypted while in use. Rather, storage is only encrypted at the human-machine interface, such as when a storage snapshot is taken by the operating system to debug a problem, or by tools that display memory to humans (such as an operator console).

Figure 6:
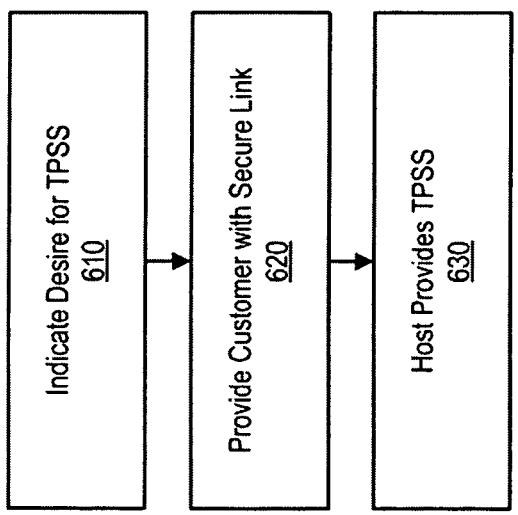
FIG. 6 depicts a flow chart of the operation of a third party secured storage system.

Referring to FIG. 6, a flow chart of the operation of the third party secure storage system 248 is shown. More specifically, when selecting a hosting service, a customer may indicate a desire to have some or all of its information hosted within a secure storage memory at step 610. Because this is a value added feature, the hosting service may charge a premium for such securely stored information. When a customer selects such a secure storage option, the customer is provided a secure link to a management Web page for the Web services at step 620. This management Web page enables the customer to perform a plurality of functions relating to controlling the Web service, such as turning the service on (i.e., making die Web service available), turning the service off (i.e., making the service unavailable), etc. Additionally, the management Web page provides an option, which is configurable via the management page, for the customer to execute the Web service in within third party secure storage. Along with this option, the customer is provided with the ability to set the security key (e.g., either an encryption key or a strong password). When the customer sets this option, the host computer operating system/middleware at the hosting facility will honor the request and only executes the Web service in TPSS at step 630. Thus, the customer Web service information is executed within the third party secured memory 320, making the customer Web service data inaccessible to personnel of the hosting service.

If a problem occurs with this Web service and a storage dump or other debugging tool must be used, the hosting service personnel will need to obtain permission to view the sensitive parts of storage (i.e., the parts that are stored and protected by the third party secured storage). The permission might be obtained via a telephone call to obtain the password from the customer, in which case the customer could then change the security code after the debugging session. Alternately, the customer might opt to debug the problem itself. In this case, the customer might enter the security key on the management Web site or might request that a secure storage dump be performed in which the encrypted information is provided to the customer (or a customer designee). The customer could then decrypt the data at its own location and debug the issue itself.

Much of the benefit of TPSS can be implemented without hardware changes. Instead, TPSS is implemented by changing the debugging tools and storage capture tools either inside the operating system or middleware. However there are facilities on some operating platforms where storage can be viewed by operator consoles or other hardware means. These facilities are also modified to honor TPSS (so that those platforms can be advertised as supporting this extra security facility) and these may require hardware changes, or microcode changes, or both.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 7:
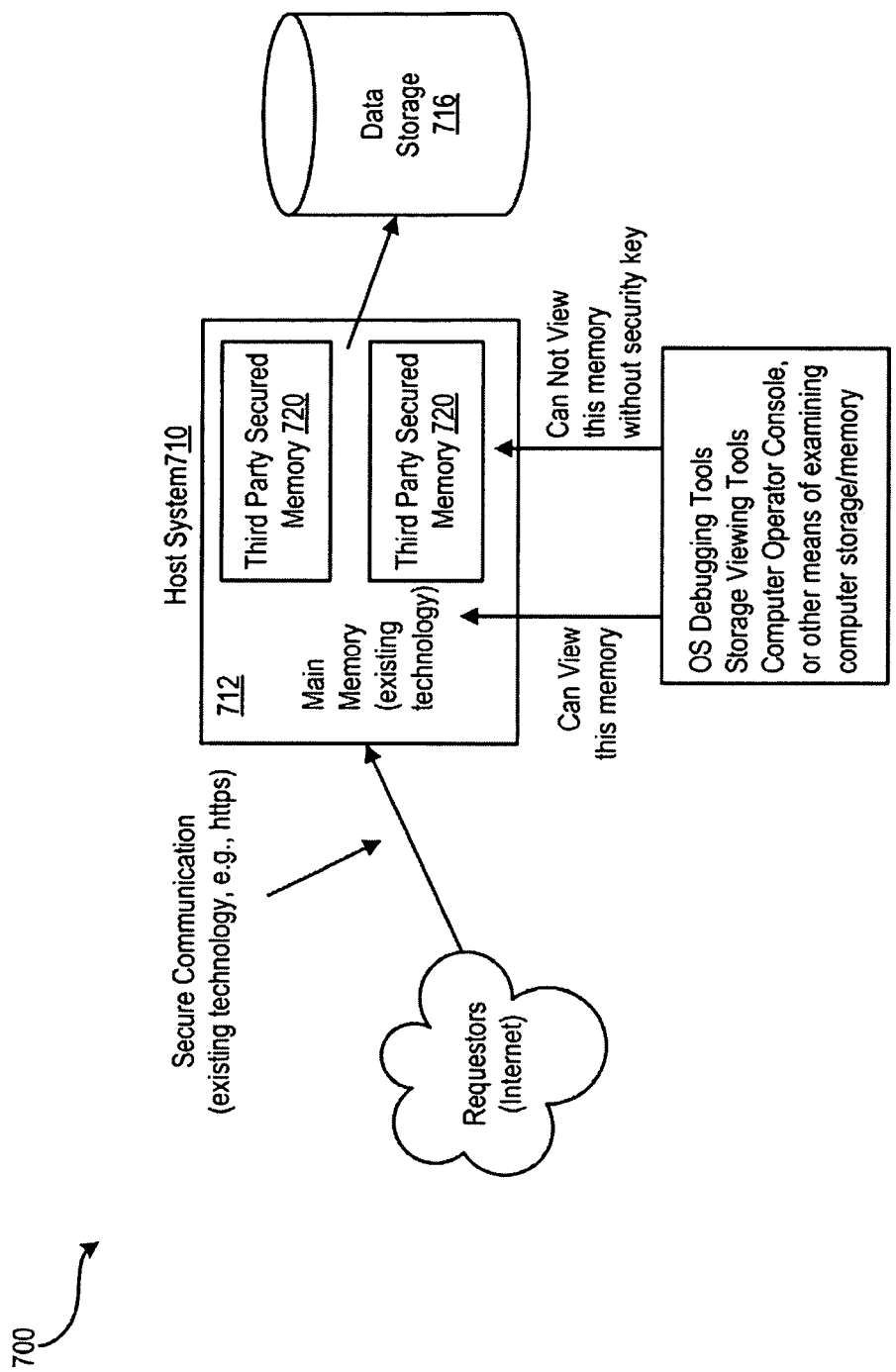
FIG. 7 depicts an alternate third party storage environment.

For example, referring to FIG. 7, a single host system 710 (including a corresponding main memory 712) might host multiple customers where each customer has a corresponding third party secured memory 720 which is accessible via respective security keys.

Also for example, it will be appreciated that in the context of the present invention, the term application can include either or both a Web application and/or a Web service.

Having thus described the invention of the present application in detail and by reference to preferred embodiments thereof, it will be apparent that modifications and variations are possible without departing from the scope of the invention defined in the appended claims.

What is claimed is:

1. A method for providing third party secured memory storage on a host computer, the host computer comprising a main memory and a third party secured memory, the method comprising:
   allowing access to information stored on the main memory by hosting company personnel, the information stored on the main memory comprising an operating system and middleware;
   storing third party information on the third party secured memory;
   encrypting the third party information stored on the third party secured memory upon access by a user, the encrypting being via a security key, the encrypting providing third party secured storage on the host computer so as to prevent access to the third party information by the hosting company personnel, the security key being held at a customer location, the customer location being remote from a location of the host computer;
   enabling unencrypted access to the third party information only to users having the security key; and,
   encrypting the third party information at a human-machine interface;
   enabling configuration of a service to execute on the host computer;
   allowing a customer to indicate a desire to have some or all of its information hosted within the third party secured storage, the information being hosted within the third party secured storage being charged at a premium when compared to information not hosted within the third party secured storage; and,
   enabling generation of the security key by a customer when configuring the service to execute on the host computer; and wherein
   the third party information is accessed by applications interacting with the host computer;
   the applications accessing the third party information do not need to use the security key to access the third party information; and,
   the third party secured storage enabling hosting company personnel to have access to the host computer for debugging purposes while protecting any sensitive customer data from access by any unauthorized individual.

2. The method of claim 1 wherein:
the security key comprises an encryption key.

3. The method of claim 1 wherein:
configuring the service to execute on the host system is performed via a management Web page.

4. A computer program product, the computer program product comprising:
   a tangible non-signal propagating computer usable storage medium having computer usable program code embodied therewith, the computer program product providing third party secured memory storage on a host computer, the host computer comprising a main memory and a third party secured memory, the computer usable program code comprising:
   computer-usable program code configured to allow access to information stored on the main memory by hosting company personnel, the information stored on the main memory comprising an operating system and middleware;
   computer usable program code configured to store third party information on the third party secured memory;
   computer usable program code configured to encrypt the third party information stored on the third party secured memory upon access by a user, the encrypting being via a security key, the encrypting providing third party secured storage on the host computer so as to prevent access to the third party information by the hosting company personnel, the security key being held at a customer location, the customer location being remote from a location of the host computer;
   computer usable program code configured to enable unencrypted access to the third party information only to users having the security key; and, computer usable program code configured to encrypt the third party information at a human-machine interface;

computer usable program code configured to enable configuration of a service to execute on the host computer;

computer usable program code configured to allow a customer to indicate a desire to have some or all of its information hosted within the third party secured storage, the information being hosted within the third party secured storage being charged at a premium when compared to information not hosted within the third party secured storage; and, computer usable program code configured to enable generation of the security key by a customer when configuring the service to execute on the host computer; and wherein the third party information is accessed by applications interacting with the host computer; and, the applications accessing the third party information do not need to use the security key to access the third party information;

the human-machine interface comprises at least one of a storage snapshot obtained via an operating system to perform a debug operation and tools that display memory to humans; and, the third party secured storage enabling hosting company personnel to have access to the host computer for debugging purposes while protecting any sensitive customer data from access by any unauthorized individual.

5. The computer program product of claim 4 wherein:
the security key comprises at least one of an encryption key.

6. The computer program product of claim 4 wherein the computer usable program code further comprises:
computer usable program code configured to enable configuring the service to execute on the host system via a management Web page.

7. A system comprising:
a processor;
a data bus coupled to the processor;
a memory coupled to the processor via the data bus, the memory comprising a main memory and a third party secured memory;
a module for allowing access to information stored on the main memory by hosting company personnel, the information stored on the main memory comprising an operating system and middleware;
a module for storing third party information in the third party secured memory;
a module for encrypting the third party information stored on the third party secured memory upon access by a user, the encrypting being via a security key, the encrypting providing third party secured storage on the system so as to prevent access to the third party information by the hosting company personnel, the security key being held at a customer location, the customer location being remote from a location of the host computer;
a module for enabling access to the third party information only to users having the security key; and,
a module for encrypting the third party information at a human-machine interface;
a module for enabling configuration of a service to execute on the system;
a module for allowing a customer to indicate a desire to have some or all of its information hosted within the third party secured storage, the information being hosted within the third party secured storage being charged at a premium when compared to information not hosted within the third party secured storage; and,
a module for enabling generation of the security key by a customer when configuring the service to execute on the system; and wherein
the third party information is accessed by applications interacting with the system;
the applications accessing the third party information do not need to use the security key to access the third party information; and,
the human-machine interface comprises at least one of a storage snapshot obtained via an operating system to perform a debug operation and tools that display memory to humans; and,
the third party secured storage enabling hosting company personnel to have access to the host computer for debugging purposes while protecting any sensitive customer data from access by any unauthorized individual.

8. The system of claim 7 wherein:
the security key comprises at least one of an encryption key.

9. The system of claim 7 further comprising:
a module for configuring a service to execute on the host system via a management Web page.

* * * * *